(12) United States Patent
Shapourian et al.

(10) Patent No.: US 12,388,537 B2
(45) Date of Patent: Aug. 12, 2025

(54) PHOTONIC ONE-WAY QUANTUM REPEATER

(71) Applicant: Cisco Technology, Inc., San Jose, CA (US)

(72) Inventors: Hassan Shapourian, San Mateo, CA (US); Daoheng Niu, Austin, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 317 days.

(21) Appl. No.: 18/297,709

(22) Filed: Apr. 10, 2023

(65) Prior Publication Data

US 2025/0007620 A1    Jan. 2, 2025

(51) Int. Cl.
| | |
|---|---|
| H04B 10/00 | (2013.01) |
| G06N 10/20 | (2022.01) |
| G06N 10/40 | (2022.01) |
| G06N 10/70 | (2022.01) |
| H04B 10/29 | (2013.01) |
| H04B 10/70 | (2013.01) |
| H04J 14/00 | (2006.01) |

(52) U.S. Cl.
CPC ............. *H04B 10/70* (2013.01); *G06N 10/20* (2022.01); *G06N 10/40* (2022.01); *G06N 10/70* (2022.01); *H04B 10/29* (2013.01)

(58) Field of Classification Search
CPC ...................................................... H04B 10/70
See application file for complete search history.

(56) References Cited

U.S. PATENT DOCUMENTS

| | | | |
|---|---|---|---|
| 2012/0134675 A1 | 5/2012 | Munro et al. | |
| 2014/0363174 A1 | 12/2014 | Azuma et al. | |
| 2023/0267359 A1* | 8/2023 | Semo | G06N 10/40 |
| | | | 716/100 |
| 2025/0053843 A1* | 2/2025 | Pant | H04B 10/70 |
| 2025/0097021 A1* | 3/2025 | Figueroa | H04L 9/0858 |

FOREIGN PATENT DOCUMENTS

| | | |
|---|---|---|
| KR | 20130007207 A | 1/2013 |
| WO | 2022039818 A2 | 2/2022 |

OTHER PUBLICATIONS

Li, Z., et al., "Experimental quantum repeater without quantum memory," https://www.nature.com/articles/s41566-019-0468-5, published Aug. 14, 2019, 12 pages.
Niu, D., et al., "All-photonic one-way quantum repeaters," https://www.researchgate.net/publication/364437299_All-photonic_one-way_quantum_repeaters, published Oct. 18, 2022, 11 pages.

* cited by examiner

*Primary Examiner* — Daniel G Dobson
(74) *Attorney, Agent, or Firm* — Edell, Shapiro & Finnan, LLC

(57) ABSTRACT

A quantum repeater forwards quantum information along with measurement results, enabling a destination endpoint to recover the original quantum information. The quantum repeater receives an input graph state encoding at least one logical qubit from a source endpoint. The quantum repeater generates a first multi-photonic graph state and entangles the input graph state with the first graph state. The quantum repeater forwards the quantum information by providing at least a portion of the first graph state to a subsequent quantum repeater or to the destination endpoint. The quantum repeater also measures the input graph state and provides the measurement results to the destination endpoint, enabling the destination endpoint to recover the at least one logical qubit from the source endpoint.

20 Claims, 7 Drawing Sheets

500

```
┌─────────────────────────────────────────┐
│ RECEIVE INPUT GRAPH STATE ENCODING AT   │─ 510
│ LEAST ONE DATA QUBIT FROM A SOURCE      │
│ ENDPOINT                                │
└─────────────────────────────────────────┘
                    │
                    ▼
┌─────────────────────────────────────────┐
│ GENERATE A FIRST GRAPH STATE COMPRISING │─ 520
│ A PLURALITY OF PHOTONIC QUBITS          │
└─────────────────────────────────────────┘
                    │
                    ▼
┌─────────────────────────────────────────┐
│ ENTANGLE THE INPUT GRAPH STATE WITH THE │─ 530
│ FIRST GRAPH STATE                       │
└─────────────────────────────────────────┘
                    │
                    ▼
┌─────────────────────────────────────────┐
│ MEASURE THE INPUT GRAPH STATE TO        │─ 540
│ GENERATE MEASUREMENT RESULTS            │
└─────────────────────────────────────────┘
                    │
                    ▼
┌─────────────────────────────────────────┐
│ PROVIDE AT LEAST A PORTION OF THE FIRST │─ 550
│ GRAPH STATE TO A SUBSEQUENT QUANTUM     │
│ REPEATER OR TO A DESTINATION ENDPOINT   │
└─────────────────────────────────────────┘
                    │
                    ▼
┌─────────────────────────────────────────┐
│ PROVIDE MEASUREMENT RESULTS TO THE      │─ 560
│ DESTINATION ENDPOINT, ENABLING THE      │
│ DESTINATION ENDPOINT TO RECOVER THE     │
│ AT LEAST ONE DATA QUBIT                 │
└─────────────────────────────────────────┘
```

FIG.5

PHOTONIC ONE-WAY QUANTUM REPEATER

TECHNICAL FIELD

The present disclosure relates to optical network communication, specifically for quantum communication.

BACKGROUND

Exchanging quantum bits (i.e., qubits) forms the technological basis for quantum communication in a wide-area quantum network, such as a quantum internet. Currently, photonic qubits present the only reliable option to carry qubits across significant distances. Signal attenuation prevents direct transmission of single photons for long distance quantum communication. However, fundamental constraints imposed by quantum physics (e.g., the no-cloning theorem) does not allow the typical classical solutions, such as signal amplification, for quantum communication.

Quantum repeaters have been proposed that operate on qubits that are encoded in multi-photon states, which accommodate the potential for missing photons through quantum error correction. Each quantum repeater along the path from the source endpoint to the destination endpoint requires quantum storage and processing to recover the multi-photon state at each step.

BRIEF DESCRIPTION OF THE DRAWINGS

FIG. 5 is a flowchart illustrating operations performed by a quantum repeater to enable quantum error correction at the destination endpoint for a quantum communication, according to an example embodiment.

DETAILED DESCRIPTION

Overview

A method is provided for forwarding quantum information along with measurement results, enabling a destination endpoint to recover the original quantum information. The method includes receiving an input graph state at a quantum repeater. The input graph state encodes at least one logical qubit from a source endpoint. The method also includes generating a first graph state comprising a plurality of photonic qubits and entangling the input graph state with the first graph state. The method includes providing at least a portion of the first graph state to a subsequent quantum repeater or to the destination endpoint to forward the quantum information. The method further comprises measuring the input graph state to generate measurement results and providing the measurement results to the destination endpoint, enabling the destination endpoint to recover the at least one logical qubit from the source endpoint.

EXAMPLE EMBODIMENTS

The techniques presented herein provide for a one-way, photonic, measurement-based quantum repeater protocol that does not require any quantum memory resources. The quantum communication system encodes logical qubits in multi-photon graph states and runs a measurement-based quantum error correction system. The destination endpoint includes a decoder that determines whether the logical quantum information can be recovered or if the quantum information has been leaked to the environment or an eavesdropper.

Figure 1:
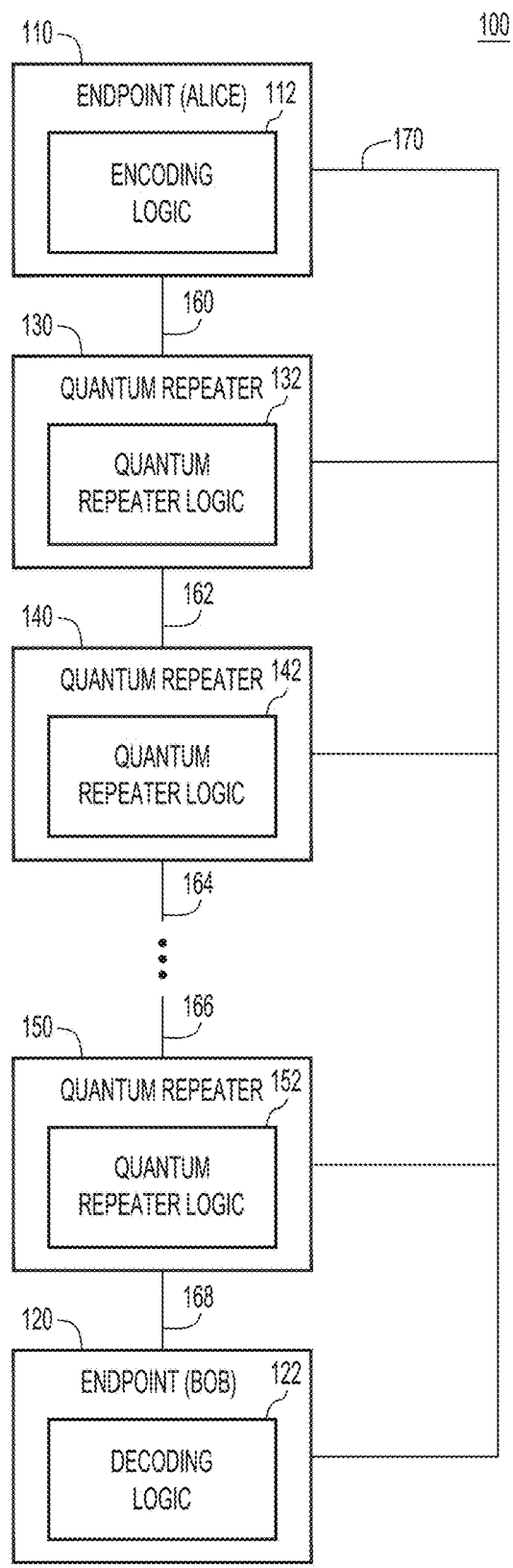
FIG. 1 is simplified block diagram of one-way photonic quantum repeater system between two endpoints, according to an example embodiment.

Referring now to FIG. 1, a quantum communication system 100 configured to relay quantum information through a series of quantum repeaters is shown. The quantum communication system 100 transfers quantum information from a source endpoint 110 (e.g., Alice) with encoding logic 112 to a destination endpoint 120 (e.g., Bob) with decoding logic 122. The encoding logic 112 enables the source endpoint 110 to encode one or more qubits of quantum information into a multi-photon graph state for transmission through the quantum information system 100. The decoding logic 122 enables the destination endpoint 120 to recover the qubits from the source endpoint 110 through quantum error correction, as described herein.

The quantum information system 100 includes a first quantum repeater 130 with quantum repeater logic 132, one or more intermediary quantum repeaters 140 with quantum repeater logic 142, and a last quantum repeater 150 with quantum repeater logic 152. The quantum repeaters 130, 140, and 150 may be functionally equivalent devices, and their respective positions as first, intermediary, or last quantum repeaters may vary based on the path for exchanging quantum information between the source endpoint 110 and the destination endpoint 120 or any other endpoints attached to the quantum information system.

The source endpoint 110 is connected to the first quantum repeater 130 with an optical link 160. In addition to the optical link 160, the optical links 162, 164, 166, and 168 form a path for photons to carry quantum information (e.g., encoded in multi-photonic graph states) from the source endpoint 110 to the destination endpoint 120. In one example, a reverse path from the destination endpoint 120 to the source endpoint 110 may be provided separately to enable two-way communication. The reverse path may include some or all of the quantum repeaters 130, 140, 150, and/or other quantum repeaters that are not along the forward path from the source endpoint 110 to the destination endpoint 120.

The quantum communication system 100 also includes a classical network 170 that allows the source endpoint 110, the quantum repeaters 130, 140, 150, and the destination endpoint 120 to share classical information, such as measurement results that enable quantum error correction. In one example, the classical network 170 may be an optical network or an electrical network that carries classical bits of information.

Figure 2:
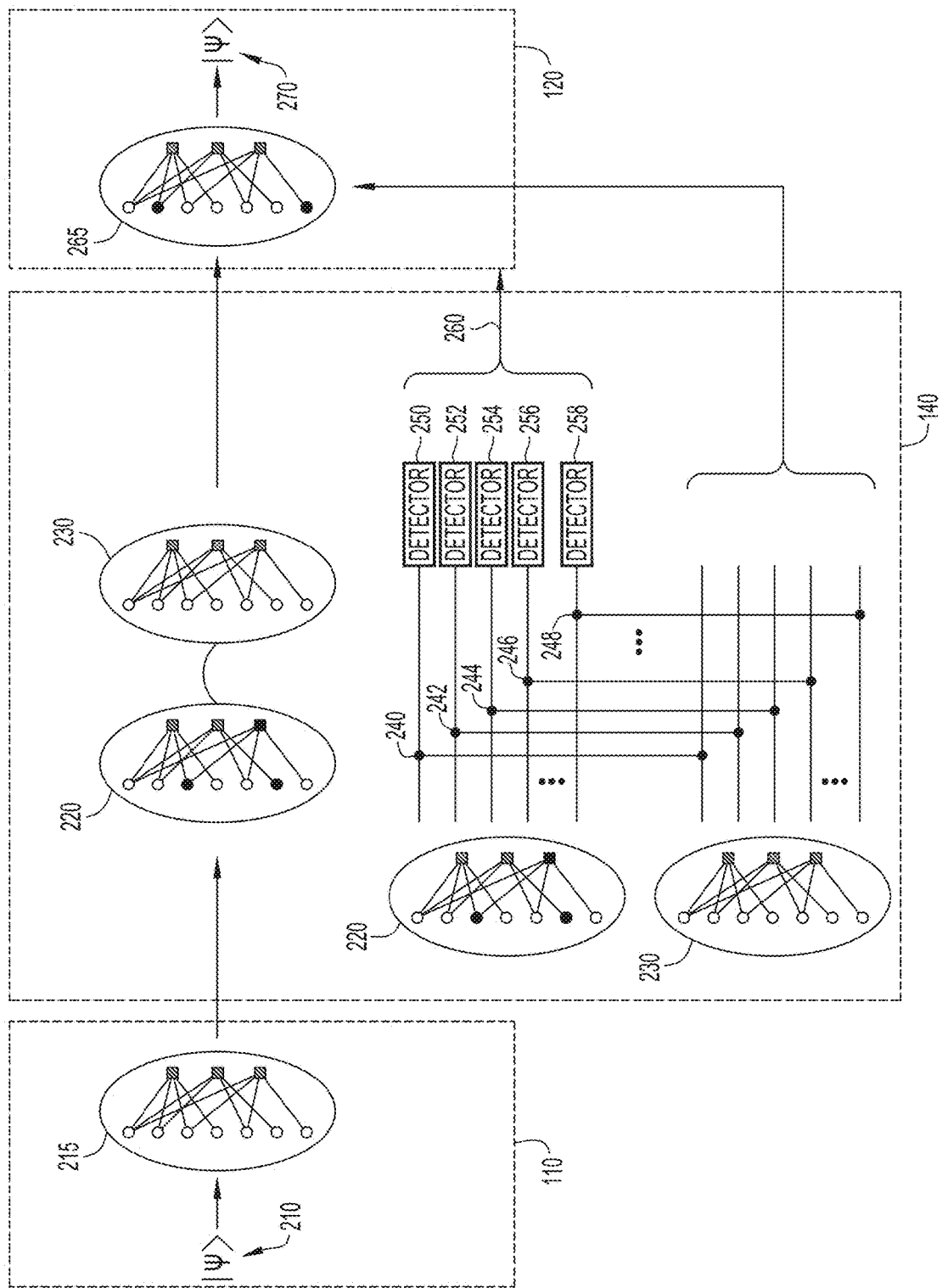
FIG. 2 is a simplified block diagram of quantum communication encoding a quantum state with quantum error correction, according to an example embodiment.

Referring now to FIG. 2, an example of transferring quantum information from a source endpoint 110 to a destination endpoint 120 through a quantum repeater 140 is shown. The quantum information in a quantum state 210 is encoded as a logical qubit in a multi-photonic graph state 215. The multi-photonic graph state 215 includes data qubits (i.e., photons) that collectively encode the quantum information from the quantum state 210 and ancilla qubits that are measured for parity and error correction calculations. The ancilla qubits are measured during or shortly after the logical qubit is encoded in the graph state 215, and the data qubits carrying the quantum information are transmitted between nodes (e.g., source endpoint, quantum repeaters, and destination endpoint).

In one example, the graph state 215 may be encoded as a Calderbank-Shor-Steane (CSS) stabilizer code. Hereinafter, the multi-photonic graph states (e.g., graph state 215) will be described as being encoded in a [[7.1.3]] Steane code for simplicity and consistency. As shown in FIG. 2, the data qubits are shown with circles and the ancillary qubits are shown as squares. However, the techniques described herein are not limited to that CSS stabilizer code and may be applied to other quantum codes, such as a [[48,6,8]] generalized bicycle code.

After the source endpoint 110 encodes the quantum state 210 in the graph state 215, the graph state 215 is transmitted to the quantum repeater 140. During the transit from the source endpoint 110 to the quantum repeater 140, one or more of the photons in the multi-photonic graph state 215 may be lost (e.g., to the environment or to an eavesdropper), and the quantum repeater 140 receives a graph state 220 that may contain one or more errors to be corrected. The errors (e.g., lost photons) are depicted as solid circles in FIG. 2.

The quantum repeater 140 generates a new graph state 230 and entangles the new graph state 230 with the received graph state 220 to pass the quantum information to the new graph state 230. The quantum repeater 140 entangles the received graph state 220 with the new graph state 230 through controlled-phase gates 240, 242, 244, 246, and 248. The data qubits in the received graph state 220 are coupled with the data qubits in the new graph state 230.

After entangling the received graph state 220 with the new graph state 230, the quantum repeater 140 measures the photons of the received graph state 220 with detectors 250, 252, 254, 256, and 258. The detectors 250, 252, 254, 256, and 258 generate measurement results 260, which are provided to the destination endpoint 120 to enable the destination endpoint 120 to perform quantum error correction.

Measuring the photons of the received graph state 220 after entangling the received graph state 220 with the new graph state 230 effectively teleports the quantum information from the quantum state 210 to be encoded in the new graph state 230, which is transmitted to the destination endpoint 120. The destination endpoint 120 receives a multi-photonic graph state 265, which may include additional errors to correct. The destination endpoint 120 uses the measurement results 260 from the quantum repeater 140 to perform quantum error correction on the received graph state 265 to recover the quantum information into a quantum state 270.

In one example, additional quantum repeaters may be included in the path between the source endpoint 110 and the destination endpoint 120. Each quantum repeater along the path performs similar operations by entangling the photons of the received graph state with a newly generated graph state and measuring the photons of the received graph state. The measurement results from each quantum repeater may be provided to the next quantum repeater or provided directly to the destination endpoint 120.

If a quantum repeater receives a set of measurement results from a previous quantum receiver along the path from the source endpoint 110 to the destination endpoint 120, then each quantum receiver may add measurement results that were generated at the quantum repeater before sending the accumulated measurement results to the next quantum repeater or to the destination endpoint. The individual quantum repeaters do not use the measurement results from previous quantum repeaters, but may pass along the measurement results to the destination endpoint 120 to enable the destination endpoint 120 to perform all of the quantum error correction.

In another example, the multi-photon graph states (e.g., graph state 215 and graph state 230) may be constructed as stabilizers for orthogonal bases (e.g., X stabilizers and Z stabilizers) to alternate stabilizer measurements at each step along the path. For instance, the graph state 215 may be constructed as an X stabilizer graph state and the graph state 230 may be constructed as a Z stabilizer graph state.

Figure 3:
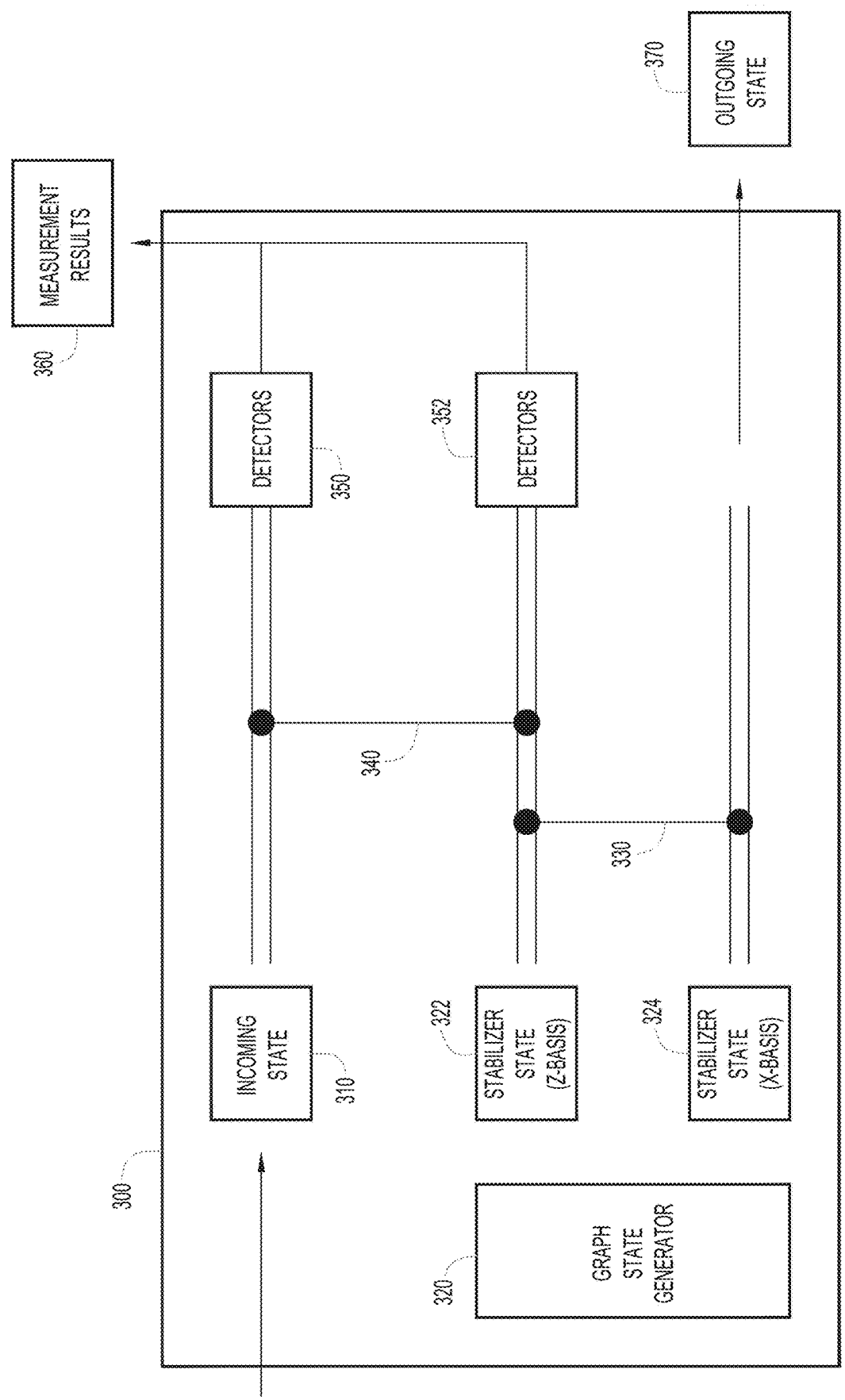
FIG. 3 is a simplified block diagram of a quantum repeater without quantum storage, according to an example embodiment.

Referring now to FIG. 3, an example of a quantum repeater 300 processing a multi-photonic graph state is shown. When the quantum repeater 300 receives the incoming state 310 (e.g., a multi-photonic graph state), a graph state generator 320 in the quantum repeater 300 generates two stabilizer states 322 and 324. The stabilizer states 322 and 324 are generated as multi-photonic graph states encoded according to a stabilizer code to correct qubit erasure error through a measurement-based error correction scheme. In one example, the stabilizer states 322 and 324 are stabilizers for orthogonal bases. For instance, the stabilizer state 322 may be a stabilizer code for measurements in the Z-basis and the stabilizer state 324 may be a stabilizer code for measurements in the X-basis.

The quantum repeater 300 entangles the stabilizer state 322 with the stabilizer state 324 through an entangling gate 330. The quantum repeater 300 then entangles the incoming state 310 with the stabilizer state 322 through an entangling gate 340. The photons of the incoming state 310 are then measured with detectors 350 and the photons of the stabilizer state 322 are measured with detectors 352 to generate measurement results 360. In one example, the detectors 350 and 352 measure the photons of the incoming state 310 and the stabilizer state 322 in the X-basis.

The measurement by the detectors 350 and 352 effectively teleports the quantum information from the incoming state to the unmeasured stabilizer state 324, which is transmitted to the next hop as the outgoing state 370. The next hop may be another quantum repeater or the destination endpoint. The quantum repeater 300 also provide the measurement results 360 to the destination endpoint through a classical channel in the network. The quantum repeater 300 may provide the measurement results 360 directly to the destination endpoint or the quantum repeater 300 may provide the measurement results 360 to a subsequent quantum repeater, which will forward the measurement results to the destination endpoint.

The teleportation process appears similar to teleportation-based error correction schemes, but the usage of CSS error correction codes across the network results in significantly greater loss tolerance. The decoder in the destination endpoint uses all the classical information obtained by measuring qubits across all the repeaters instead of breaking it down to two qubit measurements per quantum repeater.

In one example, the incoming state 310 may be a multi-photonic graph state encoding a logical qubit with data qubits connected by ancilla qubits, as described in the example of FIG. 2. In this example, the entangling gates 330 and 340 may be controlled-phase gates that operate on the photons of the incoming state 310, the stabilizer state 322 and the stabilizer state 324. For instance, the entangling gates 330 and 340 may be constructed from one or more quantum dots that entangle the quantum state of two photons.

Figure 4A:
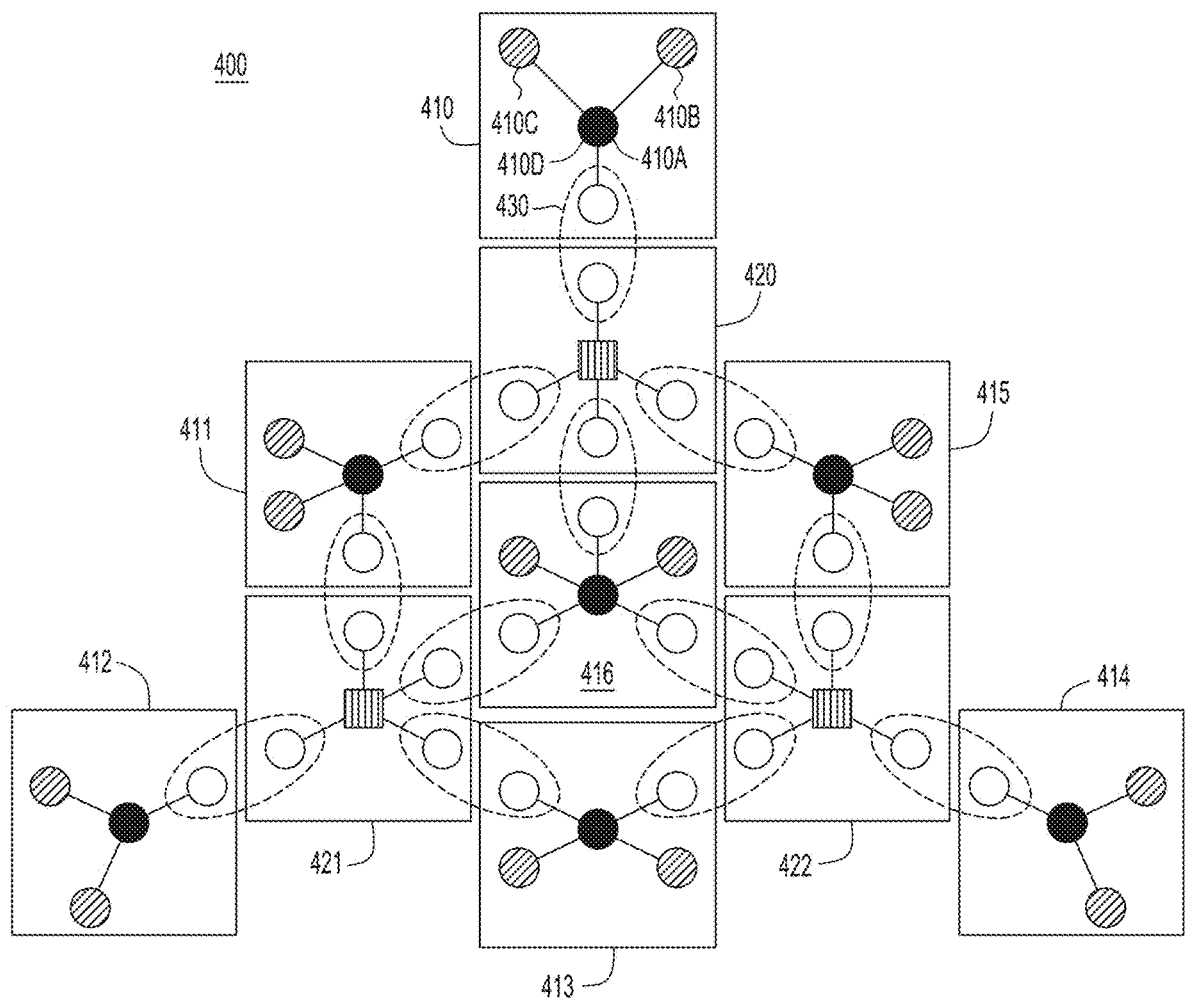
FIG. 4A illustrates a fusion-based realization of a graph state for quantum communication with quantum error correction, according to an example embodiment.

In another example, the incoming state 310 may be a fusion-based, multi-photonic graph state encoding a logical qubit with small resource states (e.g., star graphs) that are fused in the multi-photonic graph state, as described with respect to FIG. 4A. With a fusion-based graph state 310, the entangling gates 330 and 340 may be fusion measurements of previously unmeasured photons from the small resource states.

Referring now to FIG. 4A, a representation of a fusion-based graph state 400 corresponding to a [[7,1,3]] Steane code. The graph state 400 includes resource states 410, 411, 412, 413, 414, 415, 416, 420, 421, and 422. The resource state 410 is a star graph with a central qubit 410A, two unmeasured qubits 410B and 410C, and a fusion qubit 410D. The fusion qubit 410D stitches the resource state 410 to the adjacent resource state 420 through a fusion measurement 430 of the fusion qubit 410D and a corresponding fusion qubit from the resource state 420. The resource states 411, 412, 413, 414, 415, and 416 are also star graphs with a central qubit shown as a solid circle, two unmeasured qubits shown as shaded circles, and 3-5 fusion qubits shown as open circles in a fusion measurement shown as a dashed oval. The resource states 420, 421, and 422 are star graphs with a central qubit and 4 fusion qubits, but no unmeasured qubits.

Each resource state 410, 411, 412, 413, 414, 415, 416, 420, 421, and 422 may be generated deterministically based on quantum emitters or probabilistically using a nonlinear material. The two unmeasured qubits in each of the resource states 410, 411, 412, 413, 414, 415, 416, 420, 421, and 422 may be used to entangle two graph states (e.g., incoming state 310 and stabilizer state 322 as shown in FIG. 3) with a fusion gate.

In one example, the graph state 400 may encode the resource states 410, 411, 412, 413, 414, 415, and 416 as data qubits and the resource states 420, 421, and 422 as ancilla qubits to measure stabilizers according to the [[7,1,3]] Steane code. As used by the techniques presented herein, the ancilla qubits of resource states 420, 421, and 422 may be measured at each quantum repeater as part of the stabilizer measurements to produce the measurement results used by a destination endpoint to perform the quantum error correction. The graph state 400 may be generated with the ancilla qubits of resource states 420, 421, and 422 as X stabilizers or as Z stabilizers.

Figure 4B:
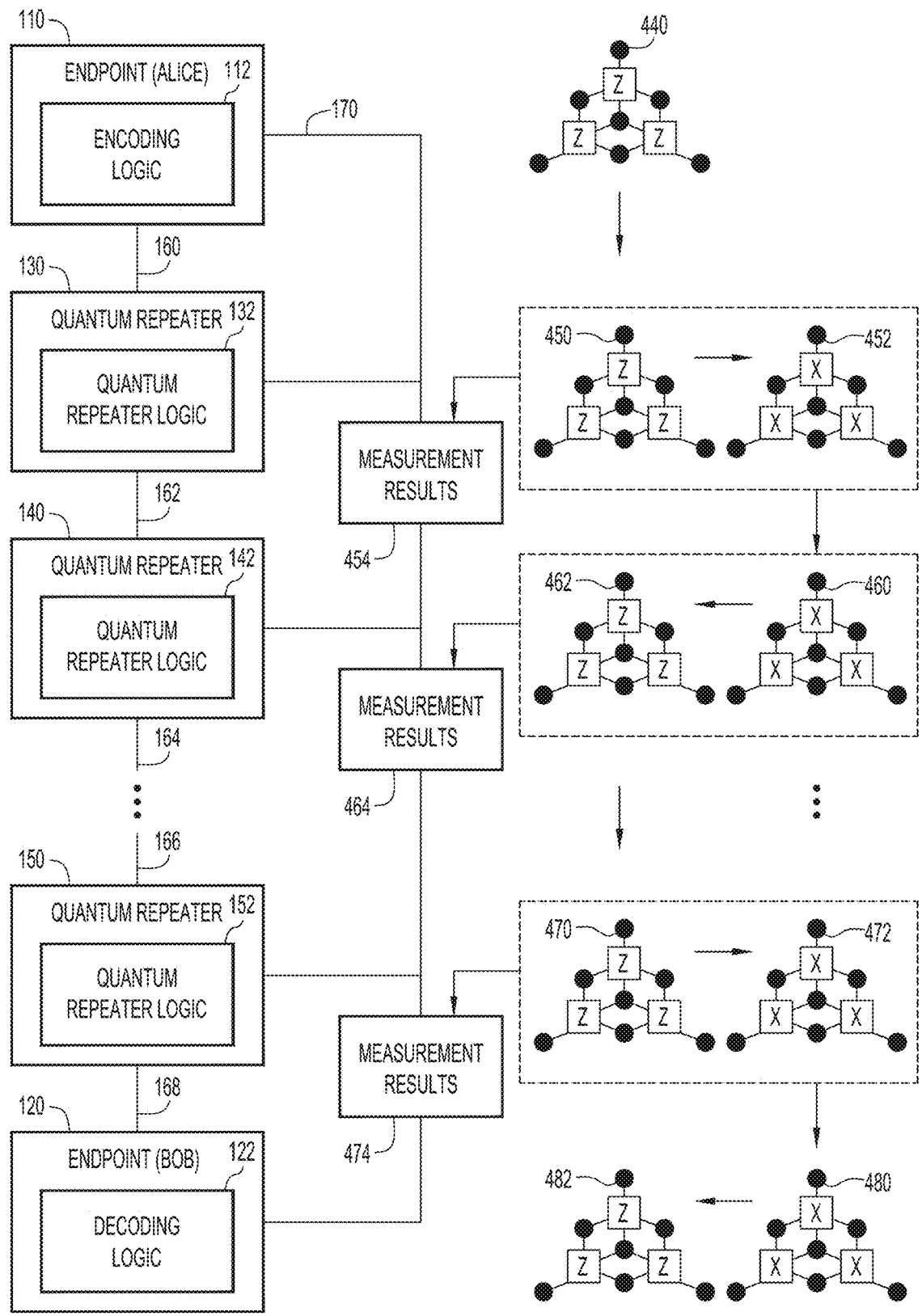
FIG. 4B illustrates the graph states used for quantum error correction alongside the corresponding quantum repeater devices, according to an example embodiment.

Referring now to FIG. 4B, an example of a sequence of quantum repeaters transferring quantum information from a source endpoint 110 to a destination endpoint 120 through [7,1.3] Steane code graph states. The source endpoint 110 encodes a quantum information into a multi-photonic graph state 440 which is generated as a Z stabilizer. The source endpoint 110 sends the graph state 440 to the first quantum repeater 130, which receives a graph state 450 including any errors that may occur during the encoding or transmission. The first quantum repeater 130 generates a new multi-photonic graph state 452 as an X stabilizer and entangles the new graph state 452 with the received graph state 450. The first quantum repeater 130 measures the received graph state 450 to generate measurement results 454, which are provided along a classical network 170 to the destination endpoint 120. The first quantum repeater 130 also transmits the new graph state 452 to the next quantum repeater 140.

The next quantum repeater 140 receives a multi-photonic graph state 460, which includes the X stabilizer graph state 452 generated at the first quantum repeater 130 and any errors from the transmission to the quantum repeater 140. The quantum repeater 140 generates a new multi-photonic graph state 462 as a Z stabilizer and entangles the new graph state 462 with the received graph state 460. The quantum repeater 140 measures the received graph state 460 to generate measurement results 464, which are provided along a classical network 170 to the destination endpoint 120. The quantum repeater 140 also transmits the new graph state 462 to a series of quantum repeaters that ends with the last quantum repeater 150. The series of quantum repeaters alternates between generating a new X stabilizer graph state and generating a new Z stabilizer graph state.

The last quantum repeater 150 receives a multi-photonic graph state 470, which is a Z stabilizer graph state that includes any errors from the transmission from the previous quantum repeater to the last quantum repeater 150. The last quantum repeater 150 generates a new multi-photonic graph state 472 as an X stabilizer and entangles the new graph state 472 with the received graph state 470. The last quantum repeater 150 measures the received graph state 470 to generate measurement results 474, which are provided along a classical network 170 to the destination endpoint 120. The last quantum repeater 150 also transmits the new graph state 472 to the destination endpoint 120.

The destination endpoint 120 receives a multi-photonic graph state 480, which is an X stabilizer graph state that includes errors from the transmission to the destination endpoint 120. The destination endpoint 120 uses the measurement results from all of the quantum repeaters (e.g., measurement results 454, 464, and 474) to recover the information from the original graph state 440 in a graph state 482.

In one example, the quantum error correction process performed by the destination endpoint 120 corrects for loss errors in transmission through optical fibers as well as for errors during the graph state generation process at each quantum repeater. The measurement results 454, 464, and 474 capture errors (e.g., photon loss) regardless of the source, and transmission errors may be corrected by the same process as generation errors.

In another example, the quantum repeater system may act on the multi-photonic graph states (e.g., graph states 440, 450, 452, 460, 462, 470, 472, 480, and 482) with controlled phase entanglement of encoded photons, as described with respect to FIG. 2. Alternatively, the quantum repeater system may act on the multi-photonic graph states (e.g., graph states 440, 450, 452, 460, 462, 470, 472, 480, and 482) with fusion-based entanglement, as described with respect to FIG. 4A.

Referring now to FIG. 5, a flowchart illustrates an example process 500 performed by a quantum repeater (e.g., quantum repeater 130, 140, or 150) to extend the range of a quantum transmission from a source endpoint to a destination endpoint. At 510, the quantum repeater receives an input graph state encoding at least one logical qubit from a source endpoint. In one example, the input graph state may be a graph state corresponding to a CSS code, such as a [[7,1,3]] Steane code or a [[48,6,8]] generalized bicycle code.

At 520, the quantum repeater generates a first graph state comprising a plurality of photonic qubits. In one example, the first graph state may include a first stabilizer state configured as a stabilizer for a first basis (e.g., an X-basis) and a second stabilizer state configured as a stabilizer for a second basis (e.g., a Z-basis) orthogonal to the first basis. Alternatively, the quantum repeater may determine the form of the first graph state (e.g., an X stabilizer code) based on the form of the input graph state (e.g., a Z stabilizer code).

At 530, the quantum repeater entangles the input graph state with the newly generated first graph state. In one example, the quantum repeater may entangle the two graph states through a set of controlled-phase gates operating on corresponding photons of the two states. In another example, the quantum repeater may generate two graph states (e.g., an X stabilizer and a Z stabilizer) as the first graph state, entangle the two graph states and then entangle one of the graph states with the input graph state.

At 540, the quantum repeater measures the input graph state to generate measurement results. In one example, the quantum repeater may also measure part of the first graph state, such as a stabilizer state that was entangled with the input graph state. In another example, the quantum repeater may measure the photons of the input graph state along the same basis (e.g., the X-basis) that was measured by other quantum repeaters along the path from the source endpoint to the destination endpoint.

At 550, the quantum repeater provides at least a portion of the first graph state to a subsequent quantum repeater or to destination endpoint. In one example, the quantum repeater provides a portion of the first graph state by transmitting a stabilizer state from the first graph state that was not measured to generate the measurement results.

At 560, the quantum repeater provides the measurement results to the destination endpoint, enabling the destination endpoint to recover at least the one logical qubit encoded by the source endpoint. In one example, the quantum repeater sends the measurement results directly to the destination endpoint through a classical network. In another example, the quantum repeater provides the measurement results to a subsequent quantum repeater, which will provide the measurement results to the destination endpoint. The quantum repeater may also receive measurement results from a previous quantum repeater and forward the measurement results of the previous quantum repeater toward the destination endpoint.

Figure 6:
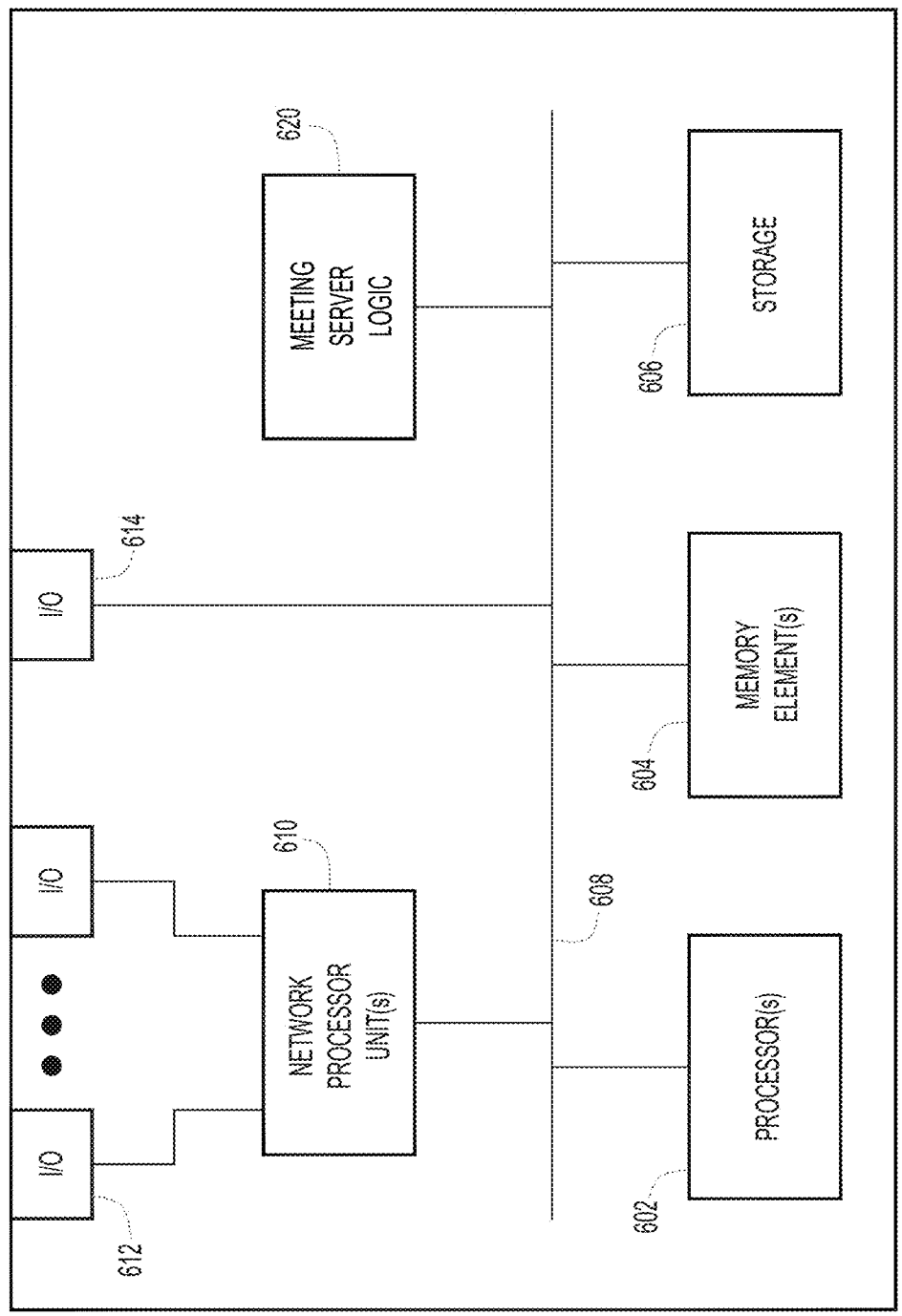
FIG. 6 is a block diagram of a computing device that may be configured to perform the techniques presented herein, according to an example embodiment.

Referring to FIG. 6, FIG. 6 illustrates a hardware block diagram of a computing device 600 that may perform functions associated with operations discussed herein in connection with the techniques depicted in FIGS. 1-3, 4A, 4B, and 5. In various embodiments, a computing device, such as computing device 600 or any combination of computing devices 600, may be configured as any entity/entities as discussed for the techniques depicted in connection with FIGS. 1-3, 4A, 4B, and 5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information, classical bits, qubits) from one state or thing to another state or thing. Any of potential classical processing elements, quantum processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store quantum data, classical data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a classical network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store classical data/information or quantum data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), light quantum memory, solid quantum memory, etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store classical data, quantum data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm·wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In summary, the techniques presented herein encode logical qubits in a graph state of photons corresponding to a CSS code and perform measurements (e.g., Bell measurements) at each quantum repeater. The classical information obtained from the measurement outcomes, which also contains measurement of loss events, bit flip errors, or any other type of errors, is not processed until received by the destination endpoint that performs the error correction across the quantum network based on the accumulated measurement results.

Unlike typical error correction methods, the individual repeaters do not perform any error correction, which offers several advantages in addition to improved error correction. Since each quantum repeater does not need to decode the received graph state into the logical qubit, the quantum repeaters do not need any quantum storage with matter qubits and do not need to make any adaptive measurements. Additionally, the quantum gates and measurements within each quantum repeater is independent of the choice of stabilizer code. These advantages provide a flexible protocol that adapts with advances in hardware technology and new generations of quantum codes.

In some aspects, the techniques described herein relate to a method including: receiving at a quantum repeater, an input graph state encoding at least one logical qubit from a source endpoint; generating a first graph state including a plurality of photonic qubits; entangling the input graph state with the first graph state; measuring the input graph state to generate measurement results; providing at least a portion of the first graph state to a subsequent quantum repeater or to a destination endpoint; and providing the measurement results to the destination endpoint, enabling the destination endpoint to recover the at least one logical qubit from the source endpoint.

In some aspects, the techniques described herein relate to a method, wherein the first graph state includes a first stabilizer state for a first basis and a second stabilizer state for a second basis, the first basis orthogonal to the second basis.

In some aspects, the techniques described herein relate to a method, wherein entangling the input graph state with the first graph state including applying a controlled-phase gate between the input graph state and the first stabilizer state.

In some aspects, the techniques described herein relate to a method, wherein measuring the input graph state includes measuring the input graph state along the first basis.

In some aspects, the techniques described herein relate to a method, further including measuring the first stabilizer state after the first stabilizer state is entangled with the first graph state to generate additional results for the measurement results.

In some aspects, the techniques described herein relate to a method, wherein providing at least the portion of the first graph state to the subsequent quantum repeater or to the destination endpoint includes providing the second stabilizer state to the subsequent quantum repeater or to the destination endpoint.

In some aspects, the techniques described herein relate to a method, wherein the quantum repeater provides at least the portion of the first graph state to the subsequent quantum repeater or to the destination endpoint without storing the input graph state.

In some aspects, the techniques described herein relate to an apparatus including: an optical input configured to receive an input graph state encoding at least one logical qubit from a source endpoint; a graph state generator configured to generate a first graph state including a plurality of photonic qubits; a processor configured to: entangle the input graph state with the first graph state; and measure the input graph state to generate measurement results; an optical output configured to provide at least a portion of the first graph state to a subsequent quantum repeater or to a destination endpoint; and a network interface configured to provide the measurement results to the destination endpoint, enabling the destination endpoint to recover the at least one logical qubit.

In some aspects, the techniques described herein relate to an apparatus, wherein graph state generator is configured to generate the first graph state as a first stabilizer state for a first basis and a second stabilizer state for a second basis, the first basis orthogonal to the second basis.

In some aspects, the techniques described herein relate to an apparatus, wherein the processor is configured to entangle the input graph state with the first graph state by applying a controlled-phase gate between the input graph state and the first stabilizer state.

In some aspects, the techniques described herein relate to an apparatus, wherein the processor is configured to measure the input graph state by measuring the input graph state along the first basis.

In some aspects, the techniques described herein relate to an apparatus, wherein the processor is further configured to measure the first stabilizer state after the first stabilizer state is entangled with the first graph state to generate additional results for the measurement results.

In some aspects, the techniques described herein relate to an apparatus, wherein the optical output is configured to provide at least the portion of the first graph state to the subsequent quantum repeater or to the destination endpoint by providing the second stabilizer state to the subsequent quantum repeater or to the destination endpoint.

In some aspects, the techniques described herein relate to a system including: a plurality of quantum repeaters, each quantum repeater configured to: receive a corresponding input graph state encoding at least one logical qubit from a source endpoint; generate a corresponding first graph state including a plurality of photonic qubits; entangle the corresponding input graph state with the corresponding first graph state; measure the corresponding input graph state to generate corresponding measurement results; and transmit at least a portion of the corresponding first graph state; and a destination endpoint configured to: receive a last graph state from a last quantum repeater of the plurality of quantum repeaters; receive a plurality of measurement results from the plurality of quantum repeaters; and recover the at least one logical qubit from the source endpoint from the last graph state based on the plurality of measurement results.

In some aspects, the techniques described herein relate to a system, wherein each quantum repeater is configured to generate the corresponding first graph state as a corresponding first stabilizer state for a first basis and a corresponding second stabilizer state for a second basis, the first basis orthogonal to the second basis.

In some aspects, the techniques described herein relate to a system, wherein each quantum repeater is configured to entangle the corresponding input graph state with the corresponding first graph state by applying a controlled-phase gate between the corresponding input graph state and the corresponding first stabilizer state.

In some aspects, the techniques described herein relate to a system, wherein each quantum repeater is configured to measure the corresponding input graph state by measuring the corresponding input graph state along the first basis.

In some aspects, the techniques described herein relate to a system, wherein each quantum repeater is further configured to measure the corresponding first stabilizer state after the corresponding first stabilizer state is entangled with the corresponding first graph state to generate additional results for the corresponding measurement results.

In some aspects, the techniques described herein relate to a system, wherein each quantum repeaters if configured to transmit at least the portion of the corresponding first graph state by transmitting the corresponding second stabilizer state.

In some aspects, the techniques described herein relate to a system, wherein each quantum repeater is configured to receive the corresponding input graph state and transmit at least the portion of the corresponding first graph state without storing the corresponding input graph state.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    receiving at a quantum repeater, an input graph state encoding at least one logical qubit from a source endpoint;
    generating a first graph state comprising a plurality of photonic qubits;
    entangling the input graph state with the first graph state;
    measuring the input graph state to generate measurement results;
    providing at least a portion of the first graph state to a subsequent quantum repeater or to a destination endpoint; and
    providing the measurement results to the destination endpoint, enabling the destination endpoint to recover the at least one logical qubit from the source endpoint.

2. The method of claim 1, wherein the first graph state comprises a first stabilizer state for a first basis and a second stabilizer state for a second basis, the first basis orthogonal to the second basis.

3. The method of claim 2, wherein entangling the input graph state with the first graph state comprising applying a controlled-phase gate between the input graph state and the first stabilizer state.

4. The method of claim 3, wherein measuring the input graph state comprises measuring the input graph state along the first basis.

5. The method of claim 3, further comprising measuring the first stabilizer state after the first stabilizer state is entangled with the first graph state to generate additional results for the measurement results.

6. The method of claim 3, wherein providing at least the portion of the first graph state to the subsequent quantum repeater or to the destination endpoint comprises providing the second stabilizer state to the subsequent quantum repeater or to the destination endpoint.

7. The method of claim 1, wherein the quantum repeater provides at least the portion of the first graph state to the subsequent quantum repeater or to the destination endpoint without storing the input graph state.

8. An apparatus comprising:
an optical input configured to receive an input graph state encoding at least one logical qubit from a source endpoint;
a graph state generator configured to generate a first graph state comprising a plurality of photonic qubits;
a processor configured to:
entangle the input graph state with the first graph state; and
measure the input graph state to generate measurement results;
an optical output configured to provide at least a portion of the first graph state to a subsequent quantum repeater or to a destination endpoint; and
a network interface configured to provide the measurement results to the destination endpoint, enabling the destination endpoint to recover the at least one logical qubit.

9. The apparatus of claim 8, wherein graph state generator is configured to generate the first graph state as a first stabilizer state for a first basis and a second stabilizer state for a second basis, the first basis orthogonal to the second basis.

10. The apparatus of claim 9, wherein the processor is configured to entangle the input graph state with the first graph state by applying a controlled-phase gate between the input graph state and the first stabilizer state.

11. The apparatus of claim 10, wherein the processor is configured to measure the input graph state by measuring the input graph state along the first basis.

12. The apparatus of claim 10, wherein the processor is further configured to measure the first stabilizer state after the first stabilizer state is entangled with the first graph state to generate additional results for the measurement results.

13. The apparatus of claim 10, wherein the optical output is configured to provide at least the portion of the first graph state to the subsequent quantum repeater or to the destination endpoint by providing the second stabilizer state to the subsequent quantum repeater or to the destination endpoint.

14. A system comprising:
a plurality of quantum repeaters, each quantum repeater configured to:
receive a corresponding input graph state encoding at least one logical qubit from a source endpoint;
generate a corresponding first graph state comprising a plurality of photonic qubits;
entangle the corresponding input graph state with the corresponding first graph state;
measure the corresponding input graph state to generate corresponding measurement results; and
transmit at least a portion of the corresponding first graph state; and
a destination endpoint configured to:
receive a last graph state from a last quantum repeater of the plurality of quantum repeaters;
receive a plurality of measurement results from the plurality of quantum repeaters; and
recover the at least one logical qubit from the source endpoint from the last graph state based on the plurality of measurement results.

15. The system of claim 14, wherein each quantum repeater is configured to generate the corresponding first graph state as a corresponding first stabilizer state for a first basis and a corresponding second stabilizer state for a second basis, the first basis orthogonal to the second basis.

16. The system of claim 15, wherein each quantum repeater is configured to entangle the corresponding input graph state with the corresponding first graph state by applying a controlled-phase gate between the corresponding input graph state and the corresponding first stabilizer state.

17. The system of claim 16, wherein each quantum repeater is configured to measure the corresponding input graph state by measuring the corresponding input graph state along the first basis.

18. The system of claim 16, wherein each quantum repeater is further configured to measure the corresponding first stabilizer state after the corresponding first stabilizer state is entangled with the corresponding first graph state to generate additional results for the corresponding measurement results.

19. The system of claim 16, wherein each quantum repeaters if configured to transmit at least the portion of the corresponding first graph state by transmitting the corresponding second stabilizer state.

20. The system of claim 14, wherein each quantum repeater is configured to receive the corresponding input graph state and transmit at least the portion of the corresponding first graph state without storing the corresponding input graph state.

* * * * *